No. 614,517. Patented Nov. 22, 1898.
W. R. TAYLOR.
FAUCET.
(Application filed Jan. 28, 1897.)
(No Model.)
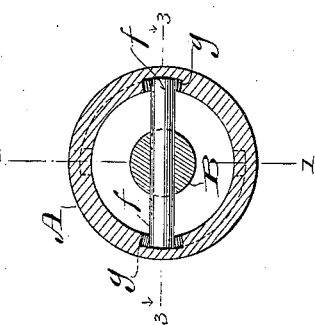
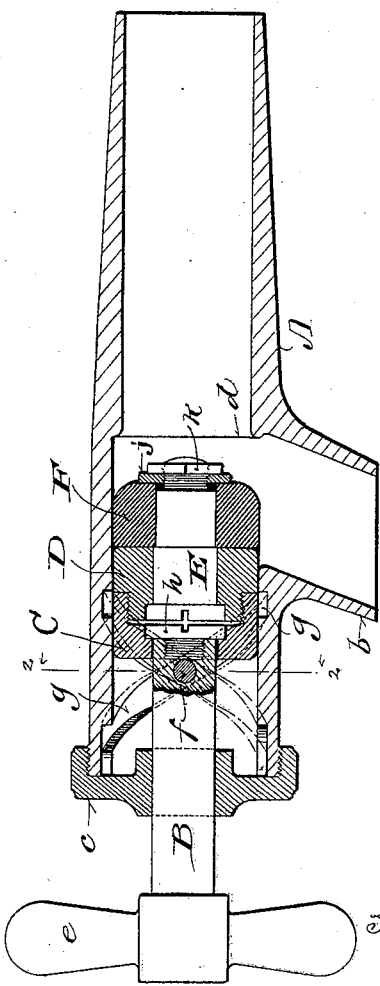
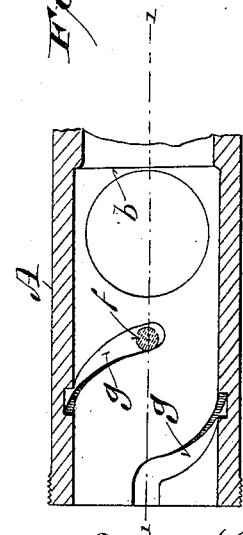
Witnesses:
Geo. W. Lowry,
N. E. Oliphant
Inventor:
Wm. R. Taylor,
By H. G. Underwood
Attorneys

UNITED STATES PATENT OFFICE.

WILLIAM R. TAYLOR, OF RACINE, WISCONSIN.

FAUCET.

SPECIFICATION forming part of Letters Patent No. 614,517, dated November 22, 1898.

Application filed January 28, 1897. Serial No. 621,021. (No model.)

*To all whom it may concern:*

Be it known that I, WILLIAM R. TAYLOR, a citizen of the United States, and a resident of Racine, in the county of Racine and State of Wisconsin, have invented certain new and useful Improvements in Faucets; and I do hereby declare that the following is a full, clear, and exact description thereof.

My invention has for its object to provide simple, economical, quick-acting, and positive cut-off faucets that may be readily cleansed throughout, these faucets being especially designed for use in connection with milk-cans and tanks. Said invention therefore consists in certain peculiarities of construction and combination of parts hereinafter particularly set forth with reference to the accompanying drawings and subsequently claimed.

Figure 1 of the drawings represents a longitudinal section of a faucet constructed according to my invention, the plane of the section being indicated by line 1 1 in the succeeding figure; Fig. 2, a transverse section on the plane indicated by line 2 2 in the preceding figure; and Fig. 3, a horizontal sectional view of the valve-incasing spout portion of the faucet, the plane of the section being indicated by line 3 3 in the second figure.

Referring by letter to the drawings, A represents the spout portion of my improved faucet, provided with a depending nozzle $b$ intermediate of its ends, and one of the latter is closed by a cap $c$ in screw-thread connection with the spout.

The bore of the spout is uninterrupted from end to end; but in rear of the nozzle there is reduction of diameter in order to provide an annular seat $d$ for a plug-valve having a stem B, that extends through a central aperture in end cap $c$, the outer end of this stem being provided with a handle $e$ to facilitate operation of the valve.

The valve-stem is provided with diametrical opposite radial projections $f$, that may be exposed ends of a pin engaging a transverse aperture in said stem, and these projections engage spirally-inclined grooves $g$, formed in the spout A forward of its nozzle.

The inner end of stem B is loose in a screw-threaded coupling C, recessed to fit the head of a check-screw $h$, engaging the tapped inner end of said stem. The screw-threaded end of a sleeve D engages the coupling, and a pin E is shown extended through the sleeve, the head of this pin being contained in a recess formed in said sleeve. Engaging pin E against the rear of the sleeve D is a disk F, of rubber or other suitable material, held in place by a washer $j$ and nut $k$ on the screw-threaded inner end of said pin.

The coupling, sleeve, and disk have diameter corresponding to the greater diameter of the spout-bore, and being united, as above specified, they constitute the plug-valve of the faucet. If the disk F be of rubber or other compressible material, tightening of the nut $k$ will operate to expand said disk, and thereby compensate for wear or loose fit of the same in the spout.

Partial rotation of stem B will cause its projections $f$ to travel in the spirally-inclined spout-grooves $g$, and thus impart longitudinal movement to the valve for the purpose of establishing or cutting off communication of the spout and its nozzle, the contour of the grooves being preferably such that a wedging action is had to crowd said valve tight on its seat.

By removal of end cap $c$ the plug-valve may be drawn out of spout A for the purpose of cleaning all parts of the faucet or repairing said valve, and particular attention is called to the fact that the bore of said spout being uninterrupted the operation of cleaning is greatly facilitated and the result assured.

Having thus described my invention, what I claim as new, and desire to secure by Letters Patent, is—

In a faucet, the combination of a spout provided with a depending nozzle and having its bore uninterrupted from end to end although reduced in diameter back of the nozzle to form a valve-seat, a cap in screw-thread union with the forward end of the spout, a stem loose in an aperture of the cap, radial stem projections engaging spirally-inclined grooves in said spout forward of its nozzle, a recessed coupling loose on the stem, a check-screw engaging the said stem and having its head within a recess of the coupling, a plug-valve in screw-thread connection with said coupling, and means for expanding a compressible portion of the plug-valve.

In testimony that I claim the foregoing I have hereunto set my hand, at Racine, in the county of Racine and State of Wisconsin, in the presence of two witnesses.

WILLIAM R. TAYLOR.

Witnesses:
MORTIMER E. WALKER,
SARA DAVIES.